United States Patent

Seki et al.

[11] Patent Number: 5,909,261
[45] Date of Patent: Jun. 1, 1999

[54] PLASMA ADDRESSED ELECTRO-OPTICAL DISPLAY

[75] Inventors: Atsushi Seki; Masatake Hayashi; Takahiro Togawa; Saori Ariji, all of Kanagawa, Japan

[73] Assignee: Sony Corporation, Tokyo, Japan

[21] Appl. No.: 08/987,391

[22] Filed: Dec. 9, 1997

[30] Foreign Application Priority Data

Dec. 9, 1996 [JP] Japan .................................. 8-328902

[51] Int. Cl.$^6$ ............................. G02F 1/133; G09G 3/36
[52] U.S. Cl. ................................ 349/32; 345/60; 313/583
[58] Field of Search ............................. 349/32, 139, 143, 349/152, 153; 313/585, 582, 584, 586, 583; 345/60, 87; 445/24, 25; 315/169.1, 169.4

[56] References Cited

U.S. PATENT DOCUMENTS

| | | | |
|---|---|---|---|
| 5,351,144 | 9/1994 | Tanamachi | 349/32 |
| 5,420,707 | 5/1995 | Miyazaki | 349/32 |
| 5,696,523 | 12/1997 | Yano | 349/32 |
| 5,714,841 | 2/1998 | Miyazaki | 349/32 |
| 5,798,812 | 8/1998 | Nishiki et al. | 349/152 |

*Primary Examiner*—Hung Xuan Dang
*Assistant Examiner*—Tai V. Duong
*Attorney, Agent, or Firm*—Hill & Simpson

[57] ABSTRACT

A plasma addressed electro-optical display is disclosed which is capable of improving current resistance of discharge electrodes disposed below cover glass to be similar to that of discharge electrodes in an effective frame and which, therefore, is enabled to be free from disconnection the reliability to be improved. The plasma addressed electro-optical display has a plasma cell formed by disposing a thin dielectric plate on a first substrate having a main surface on which a plurality of substantially parallel discharge electrodes are formed in such a manner that a predetermined distance is provided between the first substrate and the thin dielectric plate and by hermetically sealing the periphery of the first substrate and the thin dielectric plate with a sealing portion; and a second substrate disposed on the thin dielectric plate and having electrodes intersecting the discharge electrodes at substantially right angles on an opposite surface thereof in such a manner that an electro-optical material layer is interposed between the thin dielectric plate and the second substrate, wherein barrier ribs for separating the plasma cell are formed on the discharge electrodes apart from the sealing portion, a cover glass layer covering the discharge electrodes is formed in at least a region between the barrier ribs and the sealing portion, and assuming that the thickness of each of the discharge electrodes is t, the width of the same in an effective frame is $W_1$ and the width of the same below the cover glass is $W_2$, a predetermined equation is satisfied.

5 Claims, 4 Drawing Sheets

PLASMA ADDRESSED ELECTRO-OPTICAL DISPLAY

BACKGROUND OF THE INVENTION

1. Field of the Invention

The present invention relates to an image display (a so-called plasma addressed electro-optical display) using plasma whereby to activate an electro-optical material layer so as to display an image.

2. Description of Prior Art

The resolution and contrast of a liquid-crystal type display unit have been improved by, for example, a so-called active matrix addressing method, in which an active device, such as a transistor, is provided for each display pixel and the active devices are operated.

The foregoing method, however, must use a multiplicity of semiconductor devices, such as thin-film transistors, thus causing a problem of unsatisfactory low manufacturing yield to arise when a display having a large area is manufactured. Thus, there arises a problem in that the cost cannot be reduced.

To solve the foregoing problem, a method has been suggested which employs discharge plasma active devices in place of the semiconductor devices, such as MOS transistors and thin-film transistors.

An image display apparatus (hereinafter called a "plasma addressed electro-optical display") has a stacked structure composed of a liquid crystal layer, which is an electro-optical material layer, and a plasma cell, in which plasma discharge takes place. A thin and dielectric-material plate made of glass and the like is disposed between the liquid crystal layer and the plasma cell.

The plasma addressed electro-optical display has a structure that the plasma cell is divided into linear plasma chambers by barrier ribs. The plasma chambers are sequentially switched and scanned, and signal voltages are synchronously applied to transparent electrodes opposite to the plasma chambers in such a manner that the liquid crystal layer is interposed. Thus, the liquid crystal layer is operated.

The plasma addressed electro-optical display is different from a usual plasma display in that a technical limit is imposed that the thin dielectric plate is frit-sealed to form the plasma cell (a discharge cell). Therefore, there arises a necessity that the frit seal and ends of the barrier ribs (ribs) are apart from each other for a short distance. To prevent undesirable discharge in the provided region, a structure is employed in which discharge electrodes in the foregoing region are covered with cover glass.

In this case, there is a tendency that the electric resistance values of the discharge electrodes under the cover glass are higher than those of discharge electrodes in regions which are not covered with the cover glass, that is, in an effective frame.

Therefore, the regions under the cover glass easily encounter problems, such as disconnection occurring attributable to heat. In particular, an aging process for stabilizing discharge sometimes encounters a sudden flow of a large electric current. The foregoing problem easily arises in the above-mentioned case.

OBJECT AND SUMMARY OF THE INVENTION

In view of the foregoing, an object of the present invention is to provide a reliable plasma addressed electro-optical display which is capable of improving current resistance of discharge electrodes disposed below a cover glass to be similar to that of discharge electrodes in an effective frame and which, therefore, is enabled to be free from disconnection.

The reason why the resistance value of the discharge electrodes disposed below the cover glass is enlarged lies in that the uppermost layers of the discharge electrodes are damaged attributable to stress or the like occurring because of the difference in thermal expansion coefficient or a process of baking the cover glass. Thus, the uppermost layer cannot contribute to electrical conduction.

The foregoing fact has been detected as a result of examination of the dependency of the resistance values of the discharge electrodes disposed below the cover glass upon the film thickness of the discharge electrode. As a result, the thickness of the discharge electrode must be about 10 $\mu$m to contribute to the electrical conduction.

To improve the current resistance (durability with which disconnection occurring attributable to heat generated because of enlargement of the resistance value can be prevented), the damaged uppermost layers of the discharge electrodes must be compensated by enlarging the widths of the discharge electrodes.

To achieve the foregoing object, according to one aspect of the present invention, there is provided a plasma addressed electro-optical display including a plasma cell formed by disposing a thin dielectric plate on a first substrate having a main surface on which a plurality of substantially parallel discharge electrodes are formed in such a manner that a predetermined distance is provided between the first substrate and the thin dielectric plate and by hermetically sealing the periphery of the first substrate and the thin dielectric plate with a sealing portion; and a second substrate disposed on the thin dielectric plate and having electrodes intersecting the discharge electrodes at substantially right angles on an opposite surface thereof in such a manner that an electro-optical material layer is interposed between the thin dielectric plate and the second substrate, wherein barrier ribs for separating the plasma cell are formed on the discharge electrodes apart from the sealing portion, a cover glass layer covering the discharge electrodes is formed in at least a region between the barrier ribs and the sealing portion, and assuming that the thickness of each of the discharge electrodes is t, the width of the same in an effective frame is $W_1$ and the width of the same below the cover glass is $W_2$, the following equation is satisfied:

$$W_1 \times \frac{t}{t-10} \leq W_2$$

The enlargement of the width of each discharge electrode as the thickness of the same is enlarged enables an effective cross sectional area similar to that of the discharge electrodes in the other region (in the effective frame) to be obtained.

If the film thickness of the discharge electrode is too small, the specific resistance is raised and becomes instable attributable to the difference in the thermal expansion coefficient from that of the substrate glass or base glass (which is a glass layer for improving the adherence of the discharge electrodes to the substrate glass and which has a thermal expansion coefficient adapted to that of the substrate glass). If the thickness of the discharge electrode is too large on the contrary, cracks are formed in the substrate glass.

Accordingly, it is preferable that the thickness t of each of the discharge electrodes satisfies 20 $\mu$m $\leq$ t $\leq$ 50 $\mu$m.

The plasma addressed electro-optical display according to the present invention may have a structure that the distance from the first substrate to the thin dielectric plate is 4 μm to 10 μm.

The plasma addressed electro-optical display according to the present invention may have a structure that terminal electrodes for establishing the connection between the discharge electrodes and a drive circuit are formed in regions between the barrier ribs and the sealing portion.

The plasma addressed electro-optical display according to the present invention may have a structure that the terminal electrodes are made of Ag or Au.

Other objects, features and advantages of the invention will be evident from the following detailed description of the preferred embodiments described in conjunction with the attached drawings.

DETAILED DESCRIPTION OF THE INVENTION

An embodiment of the present invention will now be described with reference to the drawings.

Figure 1:
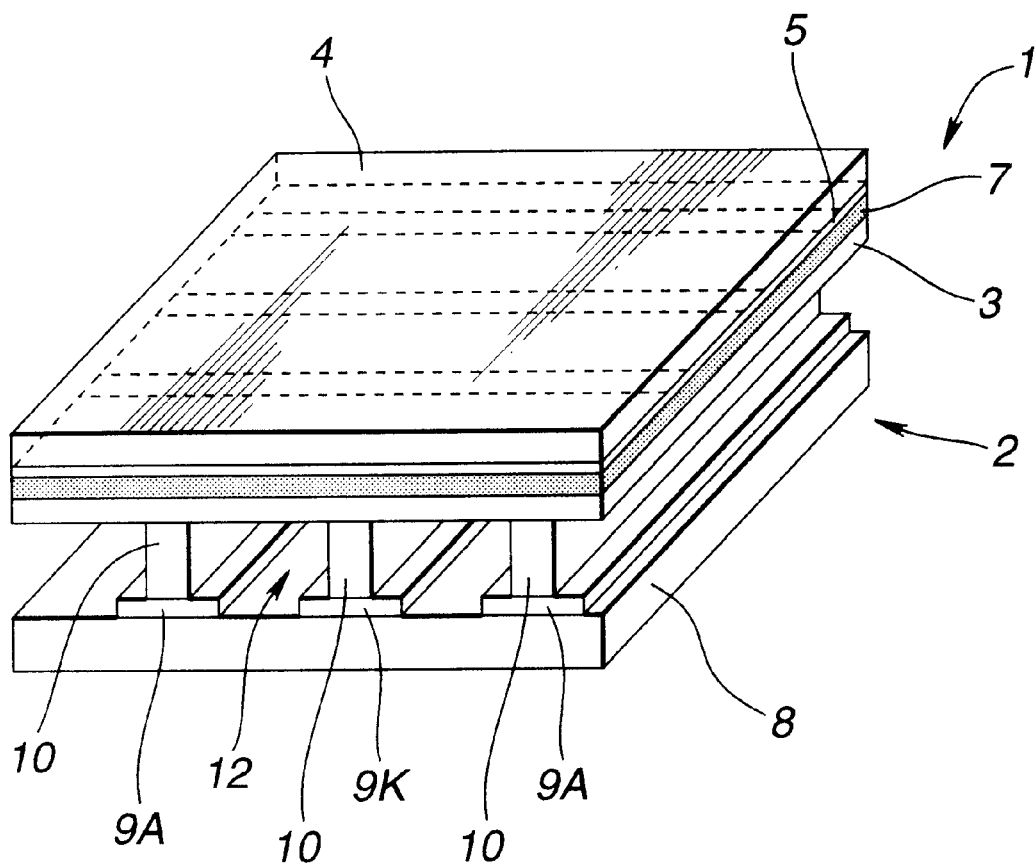
FIG. 1 is a partially-cut schematic perspective view showing an embodiment of a plasma addressed electro-optical display according to the present invention.
Figure 2:
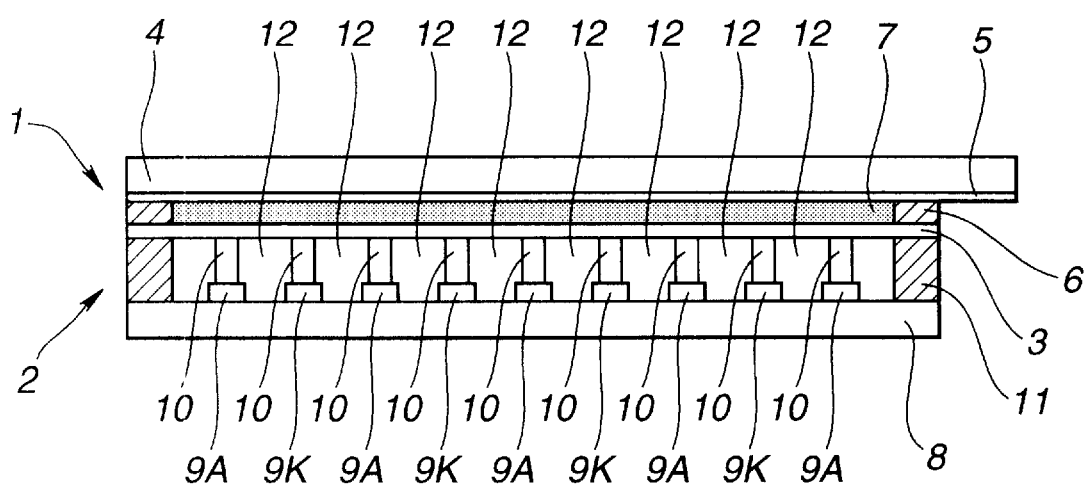
FIG. 2 is a schematic cross sectional view showing the embodiment of the plasma addressed electro-optical display according to the present invention.

A plasma addressed electro-optical display according to this embodiment has a so-called flat panel structure. The structure is formed into a stacked shape composed of an electro-optical display cell 1, a plasma cell 2 and a dielectric sheet 3, which is interposed between the electro-optical display cell 1 and the plasma cell 2, as shown in FIGS. 1 and 2.

The dielectric sheet 3 is formed by a thin glass plate and the like to serve as a capacitor. Therefore, it is preferable that the thickness of the dielectric sheet 3 is minimized to realize satisfactory electrical coupling between the electro-optical display cell 1 and the plasma cell 2 and to prevent two-dimensional expansion of electrical charges. Specifically, a thin glass plate having a thickness of about 50 μm is employed.

The electro-optical display cell 1 is manufactured in such a manner that a glass substrate (an upper substrate) 4 having a predetermined distance from the dielectric sheet 3 by virtue of a spacer 6, is joined to the upper surface of the dielectric sheet 3.

A liquid crystal material, which is an electro-optical material, is enclosed in a space between the dielectric sheet 3 and the upper substrate 4. Thus, a liquid crystal layer 7 is formed. Note that the electro-optical material may be a material except for liquid crystal.

The distance from the upper substrate 4 to the dielectric sheet 3 is determined to be, for example, 4 μm to 10 μm, which is maintained substantially uniformly over the display surface.

A plurality of data electrodes 5 made of a transparent conductive material and extending, for example, in a direction of the rows, are disposed on the surface of the upper substrate 4 opposite to the dielectric sheet 3. The data electrodes 5 are, at predetermined intervals, formed in parallel with each other in a direction of columns.

The plasma cell 2 is composed of the dielectric sheet 3 and a glass substrate (a lower substrate) 8 disposed below the dielectric sheet 3.

A plurality of anode electrodes 9A and cathode electrodes 9K extending in a direction perpendicular to the direction of the data electrodes 5, that is, in the direction of the columns are disposed on the surface of the glass substrate 8 opposite to the dielectric sheet 3. The anode electrodes 9A and cathode electrodes 9K are formed in parallel with each other and apart from each other for a predetermined distance to form a discharge electrode group.

Moreover, barrier ribs 10 each having a predetermined width and extending along the anode electrodes 9A and the cathode electrodes 9K are formed in the central portion of the upper surfaces of the anode electrodes 9A and cathode electrodes 9K. The top end of each of the barrier ribs 10 is in contact with the lower surface of the dielectric sheet 3 so that a substantially constant distance is maintained from the glass substrate 8 to the dielectric sheet 3.

The dielectric sheet 3 is hermetically joined to the glass substrate 8 at an outer periphery thereof by a frit seal 11 formed by low melting point glass and the like. Thus, the plasma cell 2 is formed into a hermetically sealed space. The hermetically sealed space is filled with a gas, ionization of which is permitted, for example, helium gas, neon gas, argon gas or their mixture gas.

The plasma addressed electro-optical display according to this embodiment has a plurality of discharge channels (spaces) 12 formed between the glass substrate 8 and the dielectric sheet 3 and separated from one another by the barrier ribs 10. The discharge channels 12 are formed in parallel with one another in the direction of the rows. The discharge channels 12 intersect the data electrodes 5 at right angles.

Figure 3:
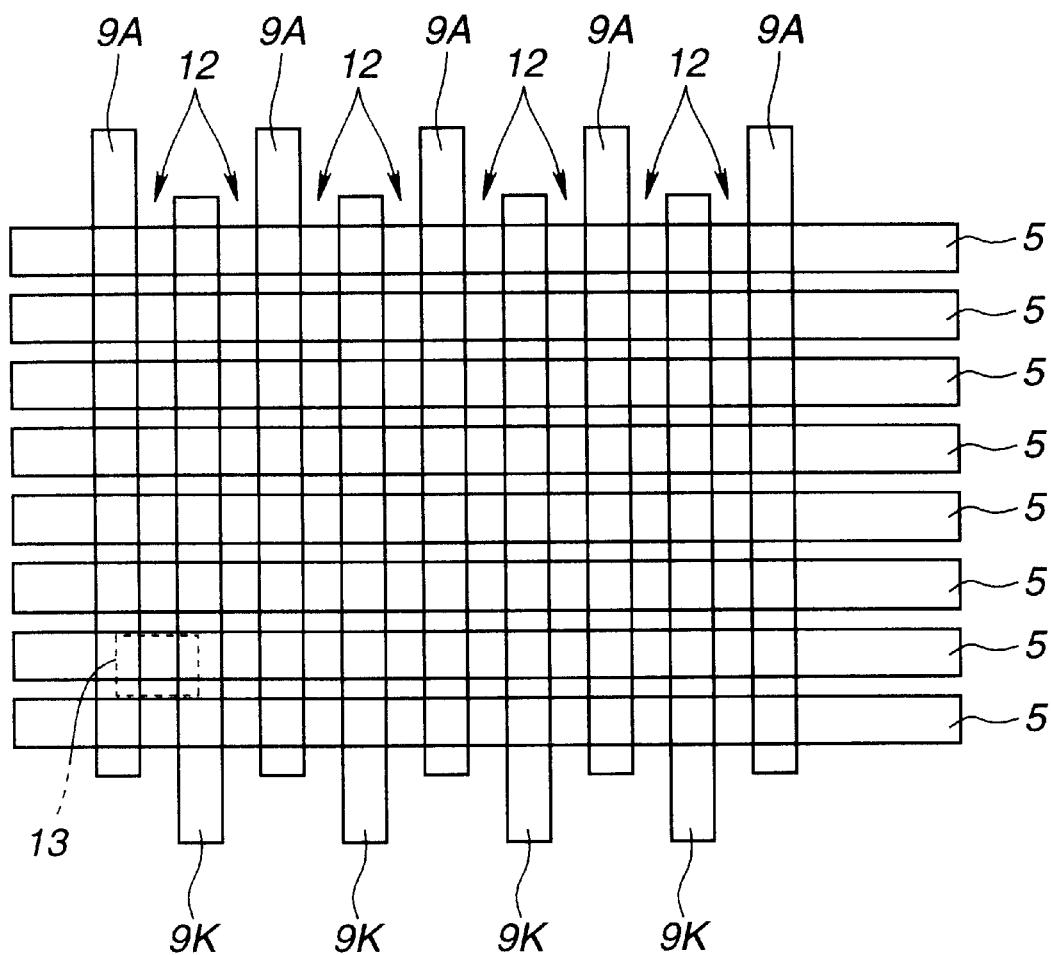
FIG. 3 is a schematic view showing a layout of data electrodes, discharge electrodes and discharge channels.

Therefore, each of the data electrodes 5 serves as a unit for operating the column, while each of the discharge channels 12 serves as a unit for operating the row. As shown in FIG. 3, intersections of the data electrodes 5 and the discharge channels 12 correspond to pixels 13.

In the plasma addressed electro-optical display having the above-mentioned structure, when a drive voltage is applied between the anode electrodes 9A and cathode electrodes 9K corresponding to predetermined discharge channels 12, the gas enclosed in the discharge channels 12 is ionized. Thus, plasma discharge takes place and the potentials in the discharge channels 12 are kept to the anode potential.

When data voltage is applied to each of the data electrodes 5 in the foregoing state, data voltage is written on the liquid crystal layer 7 corresponding to the plural pixels 13 disposed in the direction of the columns to correspond to the discharge channels 12 in which the plasma discharge has taken place.

After the plasma discharge has been completed, the potentials of the discharge channels 12 are made to be float potentials. Thus, the data voltage written on the liquid crystal layer 7 corresponding to the pixels 13 is maintained to a next writing period (for example, one field or one frame after). In this case, the discharge channels 12 serve as sampling switches and the liquid crystal layer 7 of each of the pixels 13 serves as a sampling capacitor.

Liquid crystal is operated with the data voltage written on the liquid crystal layer 7 so that display is performed at each pixel 13. Therefore, the liquid crystal layer 7 is operated similarly to the active matrix addressing method when the discharge channels 12 which generate plasma discharge are sequentially scanned and data voltage is applied to each of the data electrodes 5 in synchronization with the scanning operations. Thus, two-dimensional display can be performed.

Figure 4:
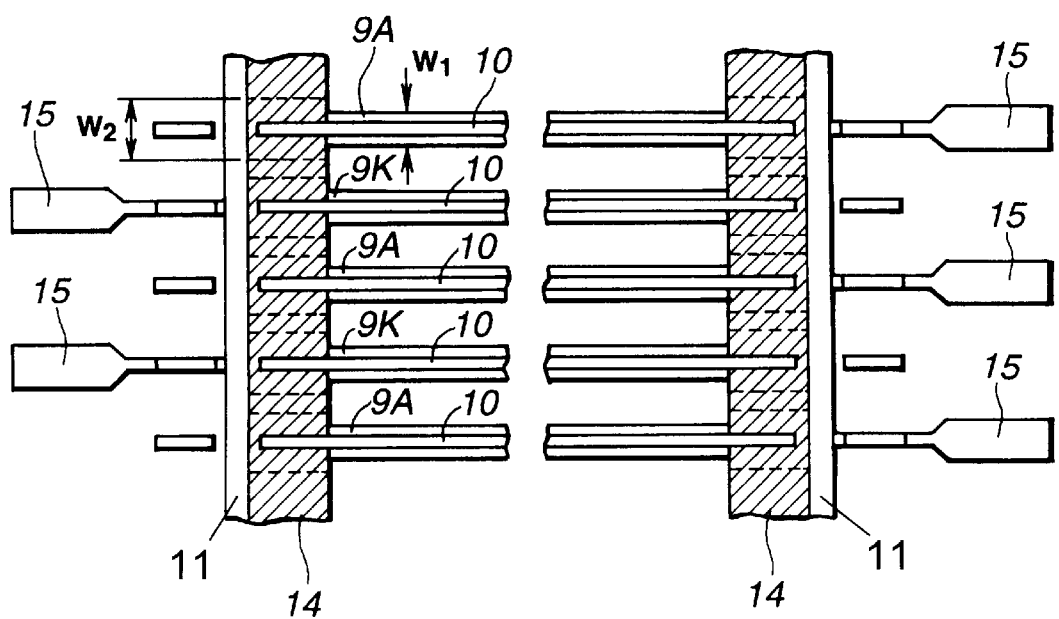
FIG. 4 is a schematic plan view showing a planar layout of the discharge electrodes.

The plasma addressed electro-optical display has the above-mentioned basic structure. As described above, the plasma addressed electro-optical display has a necessity of sealing the periphery with the frit seal 11 to bond the dielectric sheet (the thin glass plate) 3, as shown in FIG. 4.

The barrier ribs 10 which are formed on the discharge electrodes 9 must be formed slightly apart from the frit seal 11. Cover glass 14 is formed to cover the discharge electrodes in the above-mentioned regions. The regions, in which the cover glass 14 is formed, are diagonal regions shown in FIG. 4.

To establish the connection between the discharge electrodes (the anode electrodes 9A and cathode electrodes 9K) with an external drive circuit, terminal electrodes 15 are formed to serve as external connection terminals. Ends of the terminal electrode 15 are connected to the discharge electrodes (the anode electrodes 9A and cathode electrodes 9K), while other ends of the terminal electrodes 15 are allowed to pass through portions below the frit seal 11 and drawn out to the outside of the plasma cell 2.

The terminal electrodes 15 are manufactured by applying paste made of gold (Au) or silver (Ag) after which baking is performed to improve the adherence with the frit seal 11. It is preferable that the paste be gold paste because of no fear of migration.

On the other hand, the discharge electrodes (the anode electrodes 9A and cathode electrodes 9K) are manufactured by applying paste containing Ni or Al after which a baking process is formed to have stripe configuration. The discharge electrodes 9 are in the form of, so-called coarse films.

Although the anode electrodes 9A and cathode electrodes 9K may directly be formed on the glass substrate 8, they may be formed in such a manner that a base glass layer is interposed in order to improve the adherence with the glass substrate 8.

In general, each of the formed anode electrodes 9A and cathode electrodes 9K has a predetermined width. As described above, the regions covered with the cover glass 14 is at risk that the uppermost layers of the anode electrodes 9A and cathode electrodes 9K, however, may be damaged and thus disconnection may take place attributable to heat.

Accordingly, this embodiment has a structure that the width of the portion of each of the anode electrodes 9A and cathode electrodes 9K covered with the cover glass 14 is enlarged as compared with that of the other portions to solve the above-mentioned problem.

Assuming that the thickness of each of the discharge electrodes (the anode electrodes 9A and cathode electrodes 9K) is t, the width of the same in an effective frame is $W_1$ and the width of the same below the cover glass 14 is $W_2$, the width of each of the anode electrodes 9A and cathode electrodes 9K disposed below the cover glass 14 is determined to satisfy the following equation 3:

$$W_1 \times \frac{t}{t-10} \leq W_2$$

The structure satisfying the above-mentioned relationship causes the anode electrodes 9A and cathode electrodes 9K disposed below the cover glass 14 to have resistance values similar to or smaller than those of the anode electrodes 9A and the cathode electrodes 9K in the effective frame. As a result, the problem of the disconnection in the above-mentioned regions occurring due to heat can be solved.

Specifically, experiments were performed in such a manner that the thickness t of each of the anode electrodes 9A and cathode electrodes 9K was made to be 30 $\mu$m, the width $W_1$ of the same in the effective frame was 100 $\mu$m and the width $W_2$ of the same below the cover glass 14 was 200 $\mu$m. In the foregoing case, no disconnection takes place attributable to heat of the discharge electrodes. Thus, a reliable plasma addressed electro-optical display was realized.

As described above, the present invention enables the current resistance of the discharge electrodes disposed below the cover glass can be lowered to the level similar to those in the effective frame. As a result, a reliable plasma addressed electro-optical display free from disconnection can be obtained.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:
1. A plasma addressed electro-optical display comprising:
   a plasma cell formed by disposing a thin dielectric plate on a first substrate having a main surface on which a plurality of substantially parallel discharge electrodes are formed in such a manner that a predetermined distance is provided between said first substrate and said thin dielectric plate and by hermetically sealing the periphery of said first substrate and said thin dielectric plate with a sealing portion; and
   a second substrate disposed on said thin dielectric plate and having electrodes intersecting said discharge electrodes at substantially right angles on an opposite surface thereof in such a manner that an electro-optical material layer is interposed between said thin dielectric plate and said second substrate, wherein
      barrier ribs for separating said plasma cell are formed on said discharge electrodes apart from said sealing portion,
      a cover glass layer covering said discharge electrodes is formed in at least a region between said barrier ribs and said sealing portion, and
      wherein the thickness of each of the discharge electrodes is t $\mu$m for t>10, the width of the discharge electrodes in an effective frame is $W_1$ and the width of the discharge electrodes below the cover glass is $W_2$, the following equation is satisfied:

$$W_1 \times \frac{t}{t-10} \leq W_2$$

2. A plasma addressed electro-optical display according to claim 1, wherein the thickness t of each of said discharge electrodes satisfies 20 $\mu$m $\leq$ t $\leq$ 50 $\mu$m.
3. A plasma addressed electro-optical display according to claim 1, wherein the distance from said first substrate to said thin dielectric plate is 4 $\mu$m to 10 $\mu$m.
4. A plasma addressed electro-optical display according to claim 1, wherein terminal electrodes for establishing the connection between said discharge electrodes and a drive circuit are formed in regions between said barrier ribs and said sealing portion.
5. A plasma addressed electro-optical display according to claim 4, wherein said terminal electrodes are made of Ag or Au.

* * * * *